(12) United States Patent  (10) Patent No.: US 9,092,220 B2
Wyatt et al.  (45) Date of Patent:  Jul. 28, 2015

(54) METHOD AND APPARATUS TO OPTIMIZE SYSTEM BATTERY-LIFE WHILE PREVENTING DISRUPTIVE USER EXPERIENCE DURING SYSTEM SUSPEND

(75) Inventors: David Wyatt, San Jose, CA (US); Rambod Jacoby, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 510 days.

(21) Appl. No.: 13/251,195

(22) Filed: Sep. 30, 2011

(65) Prior Publication Data

US 2013/0054998 A1  Feb. 28, 2013

Related U.S. Application Data

(60) Provisional application No. 61/526,208, filed on Aug. 22, 2011.

(51) Int. Cl.
| | |
|---|---|
| G06F 1/32 | (2006.01) |
| G06F 1/00 | (2006.01) |
| G06F 15/00 | (2006.01) |
| G06F 15/16 | (2006.01) |

(52) U.S. Cl.
CPC ............ *G06F 1/3206* (2013.01); *G06F 1/3265* (2013.01); *Y02B 60/1242* (2013.01)

(58) Field of Classification Search
USPC ........................ 713/321, 322; 345/501, 522
See application file for complete search history.

(56) References Cited

U.S. PATENT DOCUMENTS

| | | | |
|---|---|---|---|
| 5,355,501 A * | 10/1994 | Gross et al. .................. 713/323 |
| 5,561,384 A | 10/1996 | Reents et al. |
| 5,600,271 A | 2/1997 | Erickson et al. |
| 6,448,812 B1 | 9/2002 | Bacigalupo |
| 6,900,820 B2 | 5/2005 | Kataoka et al. |
| 6,909,434 B2 * | 6/2005 | Takala et al. ................. 345/537 |
| 7,058,827 B2 | 6/2006 | Rose et al. |
| 7,256,788 B1 * | 8/2007 | Luu et al. ...................... 345/501 |
| 7,583,104 B2 | 9/2009 | Simmons et al. |
| 7,698,586 B2 | 4/2010 | Kim et al. |
| 7,734,943 B2 | 6/2010 | Whelan et al. |
| 7,750,912 B2 * | 7/2010 | Polzin et al. .................. 345/501 |
| 7,873,849 B2 * | 1/2011 | Mucignat et al. ............ 713/323 |
| 7,903,107 B2 | 3/2011 | Ostlund |
| 8,041,968 B2 * | 10/2011 | Tupman ....................... 713/320 |
| 8,127,153 B2 * | 2/2012 | Kapil ........................... 713/300 |
| 8,259,139 B2 | 9/2012 | Culbert et al. |
| 8,392,147 B2 * | 3/2013 | Karayi et al. ................. 702/186 |
| 2005/0068254 A1 * | 3/2005 | Booth ........................... 345/3.3 |

(Continued)

*Primary Examiner* — Thomas J Cleary
*Assistant Examiner* — Christopher A Daley

(57) ABSTRACT

A computer system comprising a graphics processor, a frame buffer, a display device, a system agent operable to detect an absence of active software applications and system configurations capable of rendering a disruptive user experience during system suspend, and a memory for storing instructions, that when executed perform a method of entering a power conservation state. The method comprises detecting a system idle event, activating the frame buffer, and storing display information in the frame buffer from the graphics processor. The method further comprises initiating a power reduction state for the graphics processor, self-refreshing the display device during the power reduction state with the display information stored in the frame buffer, and initiating a system suspend comprising a power reduction state for the computer system provided the system agent detects the absence of disruptive software and system configurations.

20 Claims, 9 Drawing Sheets

(56) References Cited

U.S. PATENT DOCUMENTS

| | | |
|---|---|---|
| 2005/0221791 A1 | 10/2005 | Angelhag |
| 2008/0082847 A1 | 4/2008 | Lee et al. |
| 2008/0143695 A1 | 6/2008 | Juenemann et al. |
| 2008/0316197 A1 | 12/2008 | Ds |
| 2010/0318725 A1 | 12/2010 | Kwon |
| 2011/0074800 A1* | 3/2011 | Stevens et al. ............... 345/545 |
| 2011/0181608 A1 | 7/2011 | Sunkara et al. |
| 2011/0242116 A1 | 10/2011 | Nath et al. |
| 2012/0079295 A1 | 3/2012 | Hayek et al. |
| 2012/0331321 A1 | 12/2012 | Kaburlasos et al. |

* cited by examiner

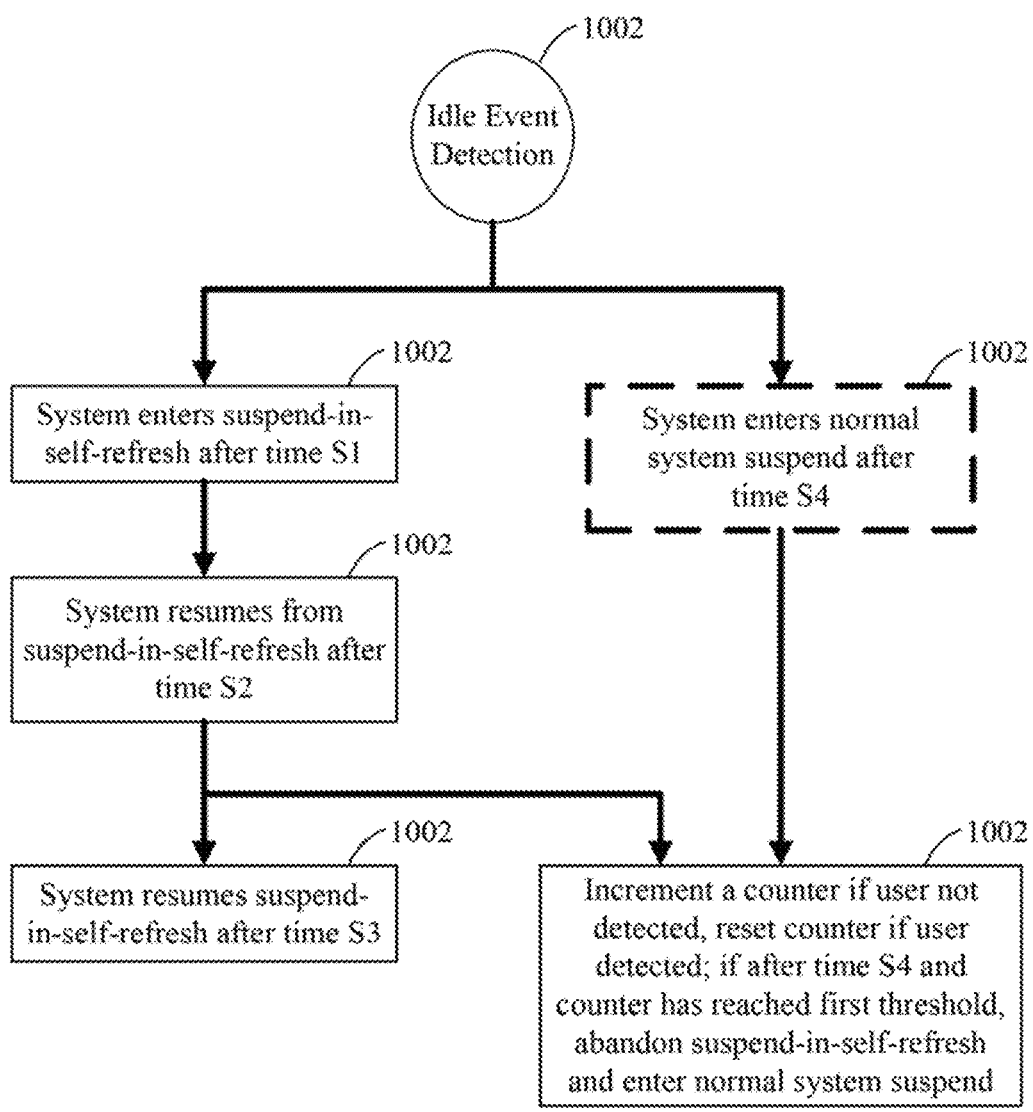

METHOD AND APPARATUS TO OPTIMIZE SYSTEM BATTERY-LIFE WHILE PREVENTING DISRUPTIVE USER EXPERIENCE DURING SYSTEM SUSPEND

CROSS-REFERENCES TO RELATED APPLICATIONS

This Application claims the benefit of U.S. Provisional Patent. Application No. 61/526,208, filed Aug. 22, 2011. This Applicant is related to U.S. patent application Ser. No. 13/251,178, filed Sep. 30, 2011.

TECHNICAL FIELD

The present disclosure relates generally to the field of power management and more specifically to the field of power management in systems that use a graphics processor.

BACKGROUND

Computer systems continue to evolve, with ever faster processing speeds, greater data handling capabilities, and increasing storage capacity. Computers have also been steadily reduced in size. This size reduction is most apparent in the laptop, notebook, tablet and hand-held computer markets. While desiring to continuously decrease the size and weight of laptops, notebooks, and hand-held computers, manufacturers have also steadily reduced the size and weight of on-board batteries. Because battery-life in laptops, notebooks, and hand-held computers is such a strong consideration, power management methods are utilized to increase battery-life.

Conventional computer systems can provide the user with a graphical user interface (GUI) that allows the user to define characteristics of system power management. In one exemplary embodiment, to save power in an idle mobile or notebook computer, a phased sleep process is provided after a detected period of inactivity. For example, the phased sleep process can begin by dimming a display device, such as a display panel, which reduces power consumption by turning down the backlight after the computer system has been idle for a prescribed length of time. A next phase can include turning the display panel off after a second prescribed length of time (e.g., display device in D3). A further phase can put the computer system into a sleep state after a third prescribed length of time (e.g., suspend in S3). Lastly, the computer system can be shut down in a hibernation step after a fourth prescribed length of time (e.g., hibernate in S4). Each of these steps in a phased sleep process can save progressively more power with a primary difference between the steps being the amount of power and the latency to enter or exit the state. To undim or wake-up the display or turn the display back on, a user needs to interact with the computer system (e.g. move the mouse or make contact with a touch pad or keyboard). Such interaction with the computer system will result in the display panel exiting the current phase of the phased sleep process, from as simple a step as undimming the display panel to resuming from a sleep state.

While many activities carried out on a computer system can be performed without interference or disruption from such power conservation states, passive or semi-passive activities will often be interpreted as computer system inactivity, resulting in the undesirable steps such as dimming the backlight or disabling the display entirely. Such passive or semi-passive activities include for example, the reading of text found in eBook reader programs, word processing programs, reading web pages, and other modes of use wherein the computer user spends the majority of the time viewing the computer screen with minimal mouse, keyboard or other system interaction. Other user activities can also potentially result in the display device undesirably dimming or powering down while it was being used. While the display can be re-enabled, and backlight can be easily restored to the desired level, by the user merely moving the mouse, touching the keyboard, or interacting with another input device, it requires a continuing pattern of user interactions with the computer system. Requiring such distracting, repeated and annoying interactions can often result in user frustration, and the user selecting power management timer settings that are so long (before dimming or powering down the display panel) that they defeat the purpose of power management. For example, to prevent the annoyance of the display device from undesirable disabling while the user is verbally presenting content on the screen or occasionally reading email while in a meeting, the user may select a maximum length of time before display disabling takes place, or even worse, turn off power conservation entirely. This dramatically shortens the battery-life and results in user complaints on the inability to achieve the product's original stated battery-life.

SUMMARY OF THE INVENTION

Embodiments of the present invention provide solutions to the challenges inherent in power conservation through graphics processor and display device usage management. In one embodiment of the present invention, a computer system for managing entry into power management states is disclosed. The computer system comprises: a graphics processor, a display controller comprising a display-local frame buffer, a display device, and a memory. The memory stores instructions, that when executed by the computer system, perform a method of entering a power management state. The method comprises detecting that the computer system is idle. With the computer system idle, the display-local frame buffer is activated. Display information transmitted by the graphics processor is stored in the display-local frame buffer.

Initially a power reduction state is initiated for the graphics subsystem including the graphics processor, and the display device is placed in a self-refresh state with the display self-refreshing from information stored in the local frame buffer. After a further period of idleness the system is placed in a system-level suspend state while the display is kept in the self-refresh state. A system timer aids in the periodic system wake-up of the system from the system-level sleep state to allow periodic update by applications. A system level agent detects the presence of applications or software, which will not tolerate system sleep without user-noticeable disruption, and if present, prevents the entry into the aforementioned system sleep state.

Exemplary embodiments provide visual continuity for the user during these periods of uninterrupted passive viewing of the display device while conserving an equivalent amount of power as more intrusive conventional power management methods. Rather than the typical disruptive experience, exemplary embodiments replace conventional idle or sleep states with states that support self-refreshing the display panel while conserving power by disabling or powering down the graphics processor, or placing the larger system into suspend sleep or powered-down state, while ensuring that there are no applications or software currently active that would produce user-noticeable disruptions.

BRIEF DESCRIPTION OF THE DRAWINGS

Embodiments of the present invention will be better understood from a reading of the following detailed description, taken in conjunction with the accompanying drawing figures in which like reference characters designate like elements and in which:

FIG. 10 illustrates an exemplary flow diagram of a method of managing computer suspend states in accordance with an embodiment of the present invention.

DETAILED DESCRIPTION

Figure 1:
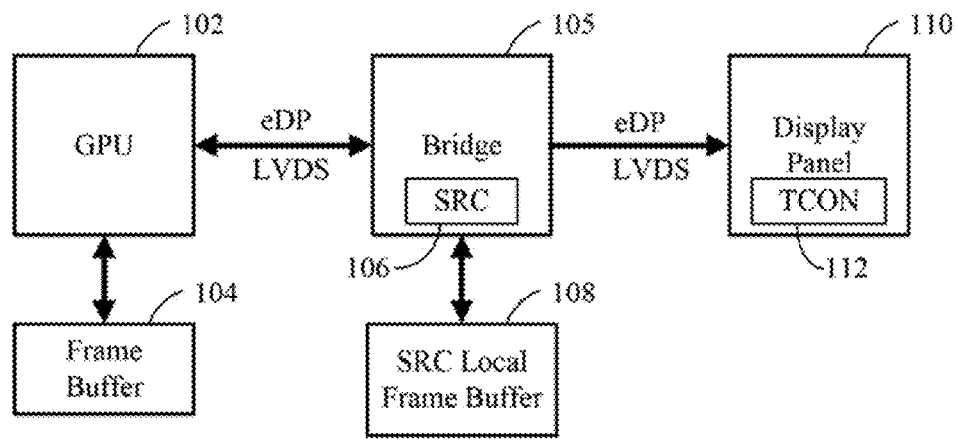
FIG. 1 illustrates an exemplary simplified block diagram of a computer controlled system having power management in accordance with an embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Visual Continuity During Passive Viewing

Embodiments of the present invention provide solutions to the increasing challenges inherent in power management through graphics processor and display device usage management. Various exemplary embodiments of the present invention provide the user with "visual continuity" for periods of uninterrupted passive viewing of the display device while conserving power. As discussed in detail below, self-refresh modes are utilized in user-optioned power management states to allow a display device, after a detected period of inactivity, to be refreshed from a local frame buffer of a self-refresh controller, thereby allowing the GPU to be disabled or powered down, with the display device remaining undimmed. In an exemplary embodiment, a computer system can provide a user-specified preference for "visual continuity" that uses display panel self-refresh and GPU sleep modes, rather than the conventional display panel backlight dimming and display panel power-down energy conservation settings. Such preferences can be passed to the GPU drivers at initialization and are changeable at run-time. Self-refreshing the display panel while sleeping (or powering down) the GPU may be transparent to the user.

Display panel self-refresh is a technology where the display panel itself, or a controller module that drives the display panel, has the ability to self-refresh from a local frame buffer the current display information. Such a frame buffer can be local to the self-refresh controller. When connected to a self-refresh capable display panel, the GPU is not required to scan-out pixels (display information) for a constant, unchanging, display image. Thus, the GPU (including its display subsystems) can be put into a low-power sleep state or optimally shut-down until a new or altered image needs to be sent to the display panel. Such new or altered images can be the result of user interactions, such as turning a page, moving a mouse, or other actions with input devices.

FIG. 1 is an exemplary simplified block diagram of a computer controlled system comprising a graphics processing unit (GPU) 102, a bridge 105 with a self-refresh controller (SRC) 106 and a display panel 110 with tinier controller 112. The GPU 102 and self-refresh controller 106 each comprise a local frame buffer 104, 108. As illustrated in FIG. 1, an exemplary GPU 102, bridge 105, and display panel 110 can communicate using an embedded display port (eDP) standard which defines standardized display panel interfacing for internal connections (e.g., graphics cards to notebook display panels), or by using a low-voltage differential signaling (LVDS) standard for transmitting video data from graphics adapters to computer monitors, such as display panels in notebook computers.

Figure 2:
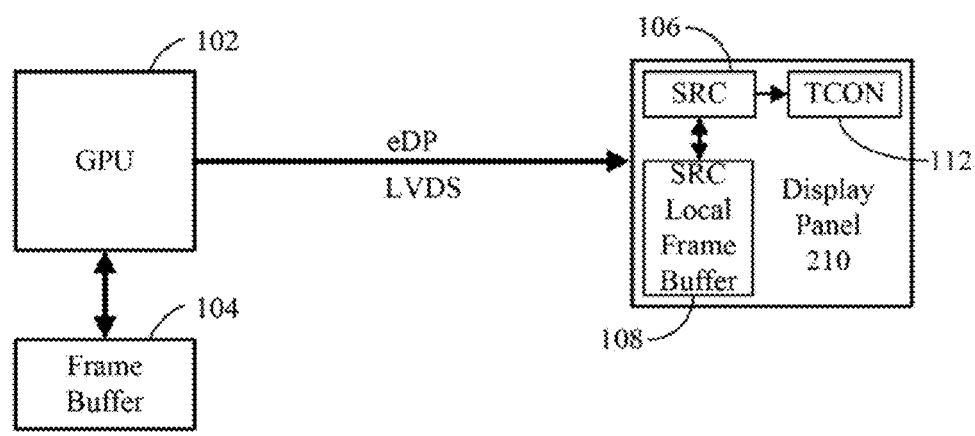
FIG. 2 illustrates an exemplary simplified block diagram of a graphics processor and display device interface in accordance with an embodiment of the present invention.

FIG. 2 is another exemplary simplified block diagram of an electronic system comprising a graphics processing unit (GPU) 102 and display panel 210. As illustrated in FIG. 2, the display panel 210 comprises an integrated self-refresh controller 106 connected with a timer controller 112. As further illustrated in FIG. 2, the integrated self-refresh controller 106 is connected to an integrated SRC local frame buffer 108, while the GPU 102 is similarly connected to a frame buffer 104. As illustrated in FIGS. 1 and 2, the SRC 106 and SRC local frame buffer 106 may be located in a display panel 210, or in a bridge 105 between the display panel 110 and the GPU 102. The SRC 106 may also be located in the GPU 102. In one exemplary embodiment, the GPU 102 and/or the South Bridge 304 can be part of the CPU 302.

Figure 3:
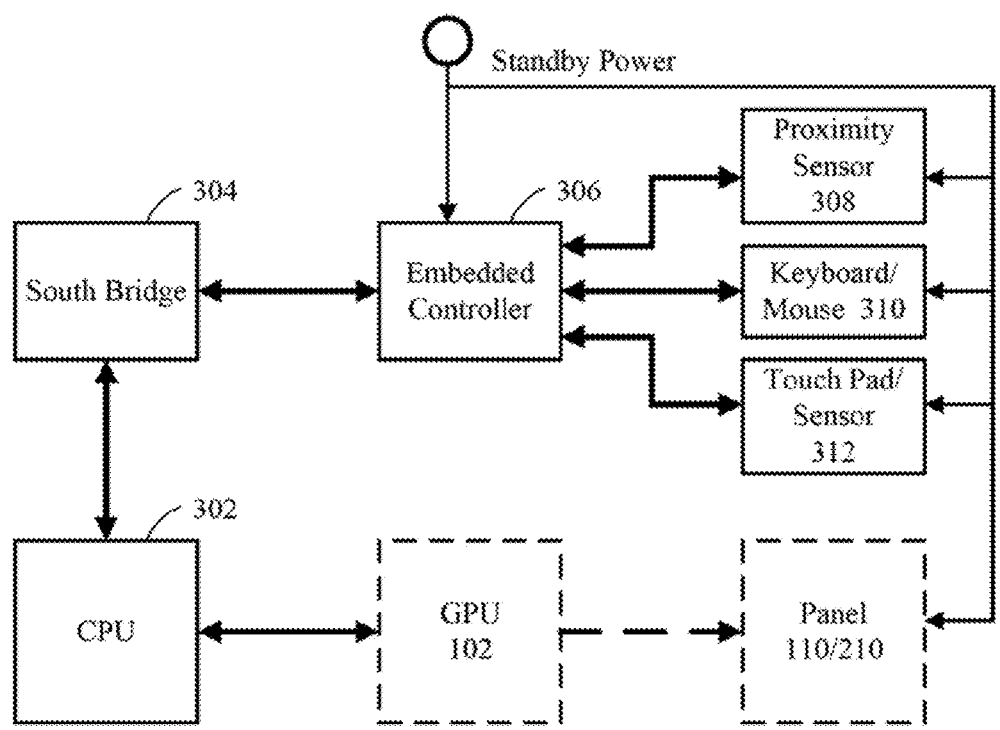
FIG. 3 illustrates an exemplary simplified block diagram of another computer controlled system having power management in accordance with an embodiment of the present invention.

FIG. 3 illustrates additional components communicating with the embodiments illustrated in FIGS. 1 and 2. FIG. 3 illustrates a proximity sensor 308, a keyboard 310, and a touchpad/sensor 312 connected to an Embedded Controller 306. The Embedded Controller 306 and input devices, e.g., the proximity sensor 308, the keyboard 310, and touchpad/sensor 312 are each connected to standby power (also known as auxiliary power, suspend or wake power, etc.) so that during a system suspend, they can remain powered in standby and are able to supply inputs to the computer system during the system suspend or sleep mode. Furthermore, as illustrated in FIG. 3, the display panel 110/210 also receives standby power so that it remains powered under the herein described self-refresh mode. Therefore, even when the computer system has entered suspend, the input devices, the Embedded Controller 306, the SRC 106 and SRC local frame buffer 108, and display panel 110/210 can remain powered. As further illustrated in FIG. 3, the Embedded Controller 306 is also connected to a South Bridge 304 that is connected to a central processing unit (CPU) 302, which is connected to the GPU 102 and display Panel 110, 210.

Figure 4:
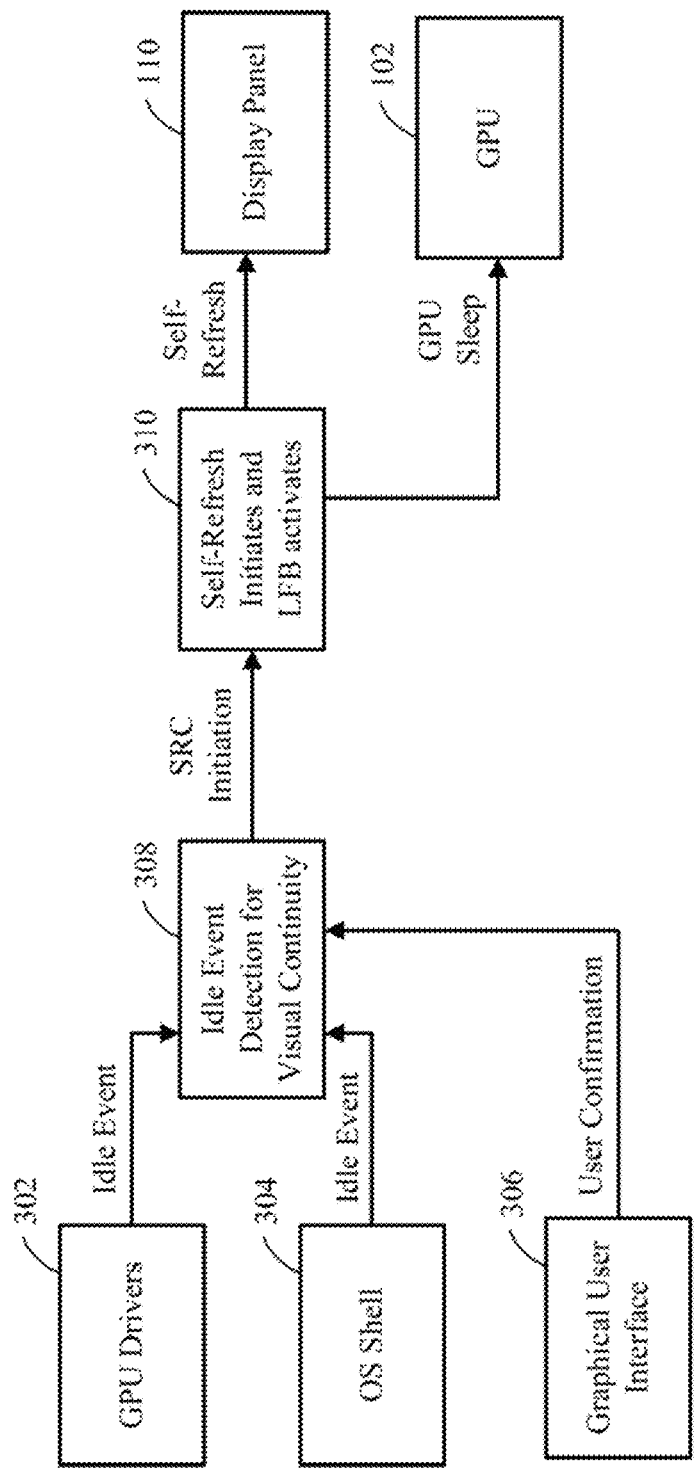
FIG. 4 illustrates an exemplary simplified block diagram of a computer controlled system having power management in accordance with an embodiment of the present invention for entering a power management state.

FIG. 4 illustrates a data flow block diagram depicting the software and hardware interactions in an exemplary process for self-refreshing a display panel and putting a GPU into a sleep mode or power-down state in response to a detected period of activity. As illustrated in FIG. 4, conventional idle events (which can for example, result in the display panel dimming) can be detected by GPU drivers 302 and/or an Operating System (OS) 304. As illustrated in block 308 of FIG. 4, when an idle event is detected (by the GPU drivers 302 or OS 304), and a graphical user interface (GUI) 306 has confirmed to the GPU drivers 302 that the user desires "visual continuity" (e.g., display device self-refresh without display dimming) then after a prescribed length of time, the "idle event" can result in the GPU drivers 302 beginning SRC initiation and eventually GPU sleep. In other words, whether initiated by the OS 304 or GPU drivers 302, when an idle event has been detected, the idle event can be intercepted by the GPU drivers responsible for the display panel self-refreshing, and instead of dimming or powering down the display panel as the idle event was intended for, the self-refresh controller 106 can be activated instead, in accordance with embodiments of the present invention.

As illustrated in block 310 of FIG. 4, upon initiation of the self-refresh controller 106, a SRC local frame buffer 108 captures display information from the GPU 102, such that after the SRC local frame buffer 108 acquires current display information for the display panel 110, the GPU 102 can be put to sleep, or placed in a reduced power setting. Optionally, the GPU 102 can also be powered down. With the GPU 102 in a sleep mode or powered down, the display panel 110 will be advantageously self-refreshed. With the GPU 102 powered down or in a sleep mode with reduced power settings, an equivalent amount of power can be advantageously conserved compared to periodically dimming the backlight or powering down the display panel 110 in response to the idle events.

In one embodiment, when the GPU 102 enters a sleep mode or is powered down, the communications link between the SRC 106 and the GPU 102 can also be dropped. Further, when the GPU 102 is put into a sleep mode or powered down, the GPU frame buffer 104 can also be powered down. In another embodiment, the GPU frame buffer 104 can optionally be kept in a self-refresh mode.

In a further embodiment, to enable the user to distinguish this mode of operation wherein the display is in self-refresh while the system is suspended, the system may place an icon or other graphical image on the screen, to allow the user to distinguish that even though the screen appears active that in fact a deeper power conservation state has been applied, or that the system has been placed in a suspend. This allows the user to understand that while in the suspended state, the system may respond more slowly. For example, when the keyboard or screen is touched, the suspended system may incur a one second delay to resume to normal operation and respond to the key that was pressed.

In one embodiment, the SRC local frame buffer 108 can be turned on only when it is time to capture a frame of display information. Such a time for turning on the SRC local frame buffer 108 would be when the GPU drivers 302 are ready to initialize the SRC 106. Once the SRC local frame buffer 1.08 has been activated, it caches the current display information (e.g., a current frame) and is then ready to send the frame of display information to the SRC 106 when the SRC 106 is ready to begin self-refreshing the display monitor 110 after the GPU 102 has been placed in a sleep mode or powered down.

In another embodiment, entry into visual continuity can be contingent upon both a user preference in a graphical user interface (GUI) selection, as well as upon a detected user presence. In other words, "visual continuity" with GPU sleep or GPU shutdown will only be initiated after periods of activity provided the user has requested visual continuity and if a user is in fact detected. Therefore, even if the user has requested visual continuity, if a user is not actually present at the computer system, as determined by the exemplary proximity sensor 308, then optionally, display panel self-refresh is not enacted and display panel dimming and eventual display panel power-down can be enacted instead, depending on user selected power management options. In other words, if a user is not detected, then a conventional phased sleep process can be used instead with display panel dimming and power-down.

An exemplary embodiment illustrated in FIG. 3 provides a proximity sensor 308 to detect the presence of a user. In other embodiments, a user presence detection mechanism can be an infra-red sensor, a camera with image detection, or a capacitive touch sensor on the mouse, touchpad or notebook shell. In further embodiments, there is no proximity sensor and the decision whether to begin self-refreshing the display panel after an idle event will be contingent upon a user preference in the graphical user interface 306.

In one embodiment, a faster entry into a suspend mode after a shorter interval of idleness may be applied as a system level policy change. Or in a further embodiment, the GPU driver 302 component may detect short durations of idleness, combined with a detected user presence and a GUI visual continuity selection, and begin self-refreshing the display panel 110 while powering down the GPU 102. In one embodiment, display panel self-refresh and GPU sleep can be coupled with faster entry into a system suspend mode. As the system is placed in suspend, an application and GPU current state can be stored and the frame buffer contents also preserved, rather than evicted, allowing a faster resume (since the applications will not be forced to recreate their state). Such shorter time limits before entry into self-refresh modes results in self-refresh modes being utilized with shorter idle event time limits than seen in convention time limits before display panel dimming. Because of "visual continuity," the idleness window can be kept short as compared to conventional dimming or display panel shutdown time limits.

In other words, system power management methods utilizing display panel self-refreshing provide "visual continuity" and allow a passive user to use the computer system without periodic input device interaction. Such use of "visual continuity" allows a much shorter idle time limit to be selected, as the display panel self-refresh mode will not distract the user. While a passive user might select a long idle event time limit for display panel dimming, a passive user can select a shorter idle event time limit for display panel self-refreshing which provides for visual continuity.

In a further embodiment, prior to entry into a deeper system off state (e.g., Hibernation S4 or Shutdown S5), the display may be caused to exit self-refresh, and after saving its current state as per the normal path, be completely powered down.

In another embodiment, the display monitor 110 can be self-refreshed even when the computer system is only momentarily idle. In other words, rather than using it only when a prescribed period of time of several seconds has elapsed, in one embodiment, the SRC 106 is used many times in a second so that there can be aggressive power management. In one exemplary embodiment, the display panel 110 can enter into a self-refresh mode twice a second.

Figure 5:
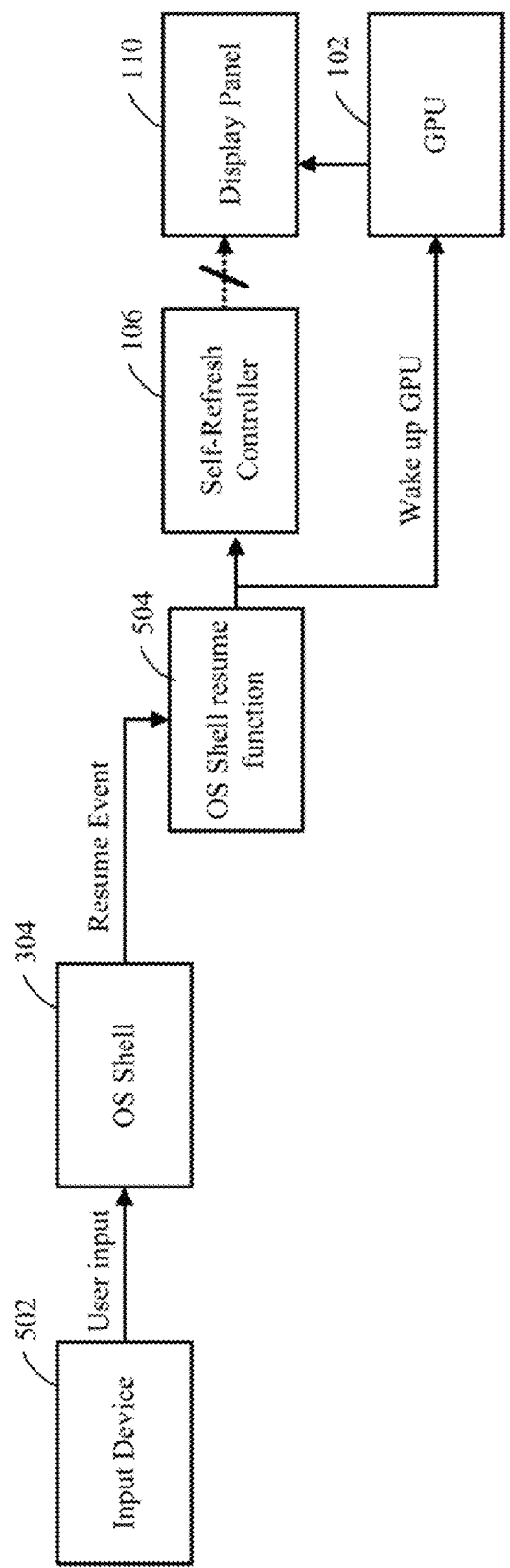
FIG. 5 illustrates an exemplary simplified block diagram of exiting a power management state in accordance with an embodiment of the present invention.

FIG. 5 illustrates a data flow block diagram depicting the software and hardware interactions in an exemplary process for a computer system resuming normal operations after a user's actions, through one or more input devices, which results in the execution of a resume function. As illustrated in FIG. 5, when an input device 502 communicates a "user input," the OS 304 receives the user input and the user input results in the OS 304 initiating a resume function, as illustrated in block 504, which results in the GPU 102 powering back up, along with any associated communications link. As further illustrated in FIG. 5, with the GPU 102 waking up and able to resuming normal functionality, the self-refresh controller 106 and SRC local frame buffer 108 can be deactivated.

With the local frame buffer 108 deactivating and the GPU 102 reactivating, the GPU 102 resumes communicating display information to the display panel 110. In one exemplary embodiment, approximately one second is required to exit a suspended system state and resume normal operations. In other words, there may be a slight delay between the time that an input device supplies an input signal to the computer system and the moment the computer system resumes. In other exemplary embodiments, the length of time required for the computer system to resume normal functionality will also be dependent upon the level of system suspension. The computer system will resume normal functionality faster when only the GPU 102 and communications link have to be powered up and returned to normal functionality, as opposed to resuming a computer system that had gone previously into a system suspend state.

In another exemplary embodiment, the user input devices, such as a keyboard/mouse 308 or touch pad/sensor 312, or presence detection devices, such as the proximity sensor 308, can trigger an early self-refresh exit, wake or system activation. In one embodiment, as illustrated in FIG. 3, these input devices, as well as the embedded controller 306 and display 110, can remain powered even while the system is in a suspend state. As discussed above, even while the computer system is in a sleep mode, a "visual continuity" user selection will provide for display panel self-refreshing while powering down or sleeping the GPU. A system level embedded controller, keyboard or mouse controller, as illustrated in FIG. 3, remains powered to allow a user to interact with these input devices, even while the rest of the system is in a reduced power state such as a suspend state. When a key-click, mouse movement, or a touchpad press is detected by these controllers, a system event can be driven to cause a system level wake from S3 suspend if applicable, or a GPU driver initiated GPU wake that exits the display panel from a self-refresh mode and returns the display panel to an active display. In one embodiment, the computer system can begin preemptively resuming normal operation when the system detects a user interacting with an input device. An example is a user touching a touchpad, wherein the touchpad detects the user's contact and recognizes that the user is about to touch the keyboard near the touchpad, allowing the system to start the resume operation, even before the actual "click" is performed.

Figure 6:
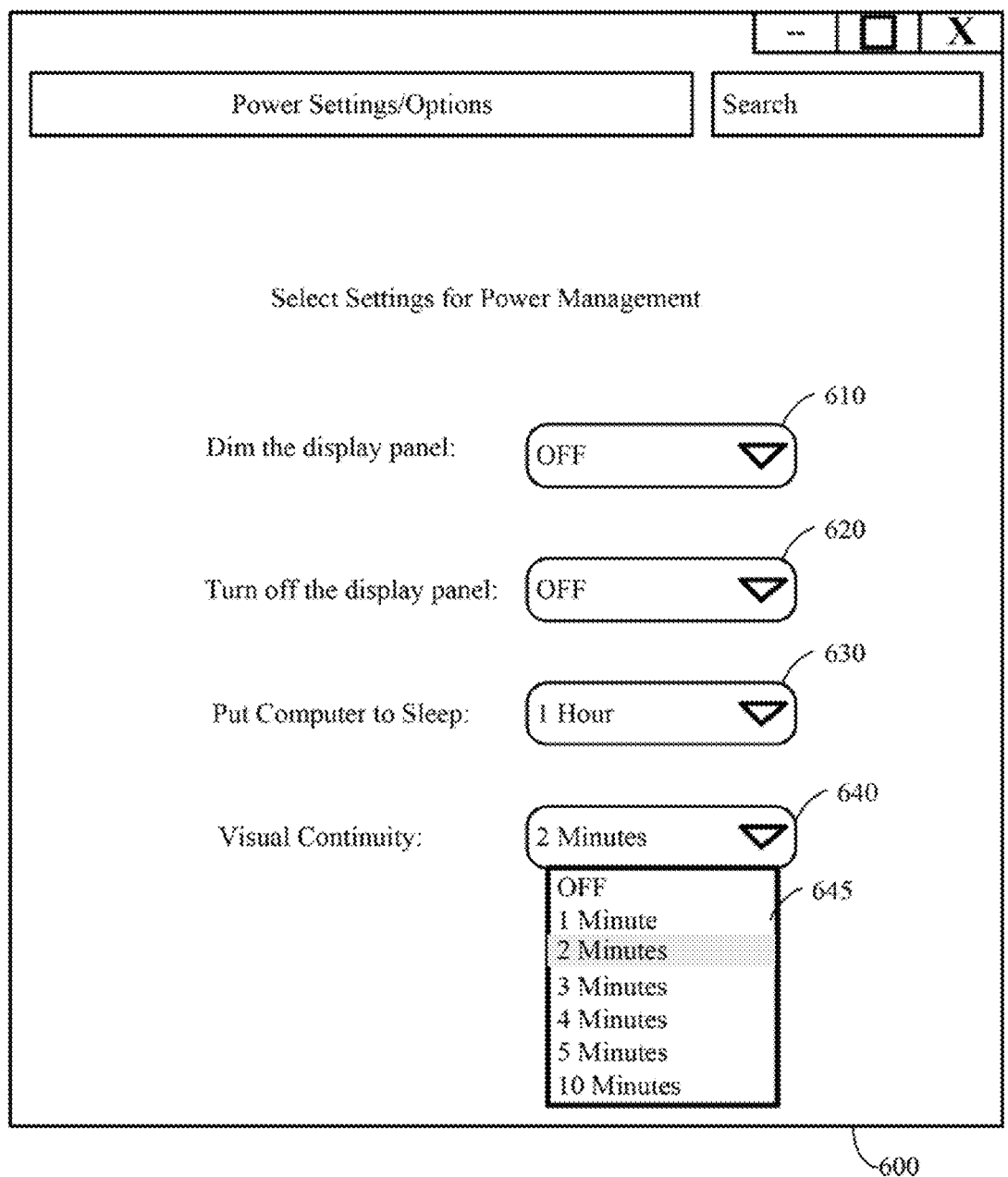
FIG. 6 illustrates an exemplary on-screen graphical user interface in accordance with an embodiment of the present invention.

FIG. 6 illustrates an on-screen system power management graphical user interface (GUI) 600. The power management GUI 600 comprises several power management setting options. First is an option to dim the panel display 610 after a selected period of inactivity (e.g., seconds). As illustrated in FIG. 6, dimming the display panel 610 can be set to OFF. Second is an option to turn off the display panel 620 after a selected period of inactivity (e.g., minutes). As also illustrated in FIG. 6, turning off the display panel 620 can also be set to OFF. Third is an option to put the computer in a sleep mode 630 (e.g. suspend) after a selected period of inactivity (e.g., 1 Hour). Lastly, there is an option to provide the user with visual continuity 640 after the computer system has been inactive after a selected period of time 645. As further illustrated in FIG. 6, a variety of time periods of inactivity 645 may be selected for activating visual continuity. As discussed herein, "visual continuity" settings provide improved GPU power conservation while providing the user visual continuity.

Various embodiments of the power management GUI 600 allow the user to select whether or not they wish to also dim 610 or turn off 620 the display panel 110 after selected periods of inactivity. In other embodiments, enabling visual continuity 640 can also automatically disable display panel dimming 610 and display panel power turn-off 620. In one embodiment, the graphical user interface 600 can be part of the Operating System software (OS) itself, such that "visual continuity" can be a system feature that is selectable by the user in OS utility applications. In other words, the option would be in the OS 304 as part of traditional power saving options, or it could be in the power saving options seen in a device driver for the GPU 102 instead.

Figure 7:
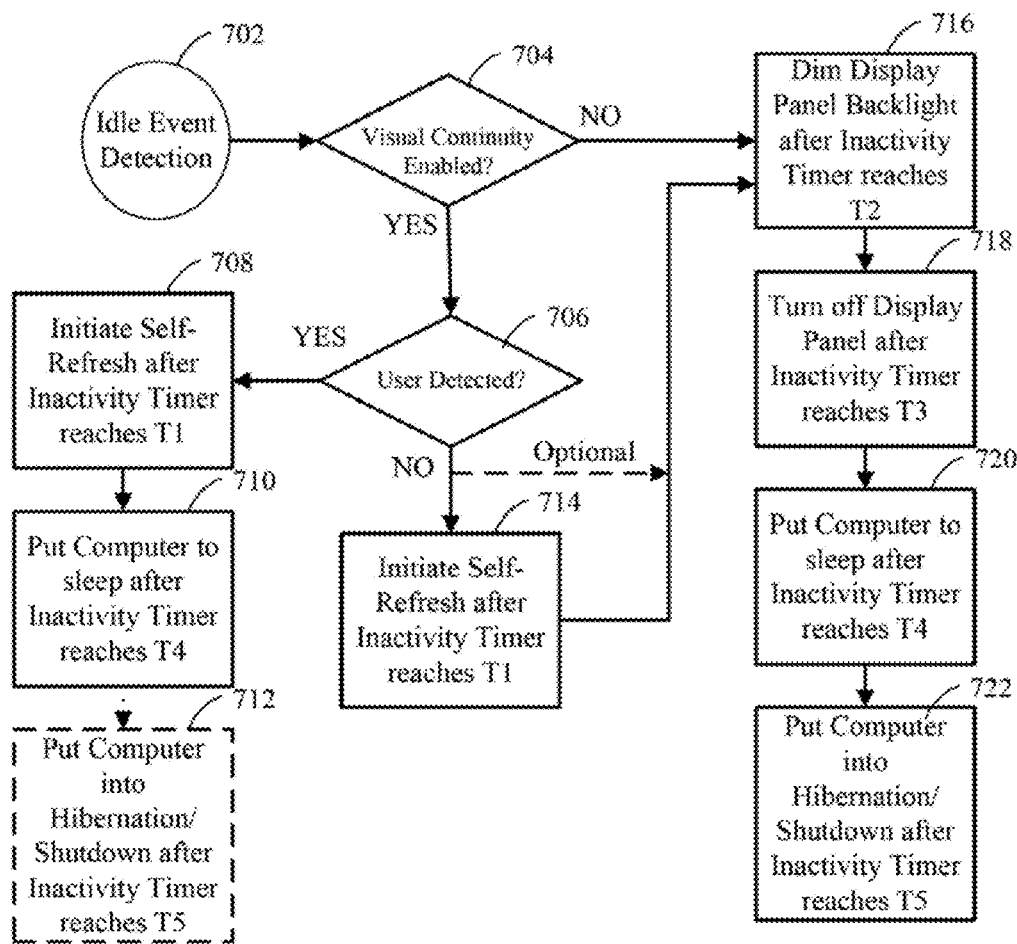
FIG. 7 illustrates an exemplary flow diagram of a method of power management in accordance with an embodiment of the present invention.

FIG. 7 illustrates a process for enabling display panel self-refresh with GPU sleep or power-down for power conservation. In step 702 of FIG. 7, an "idle event" is detected. In step 704 of FIG. 7, a determination is made as to whether or not the user has requested visual continuity. If the user has selected visual continuity, then in step 706 of FIG. 7, an optional determination is made as to whether or not a user is detected. Such detection can be performed by a proximity sensor 308 as illustrated in FIG. 3. If a user is detected in step 706, then in step 708 of FIG. 7, self-refresh is initiated after an inactivity timer reaches a first prescribed time T1. As discussed, initiating display panel self-refresh can also power down or "sleep" the GPU 102 and the associated communications link.

In step 710 of FIG. 7, the computer system is put to sleep after the inactivity timer reaches a fourth prescribed time T4, while the display panel 110 continues to be self-refreshed. In an optional step 712 of FIG. 7, the computer system can be put into Hibernation/Shutdown (S4/S5) after the inactivity timer reaches a fifth prescribed time T5. As discussed above, if the computer system is placed into hibernation or shutdown while in self-refresh mode, the SRC 106 and SRC local frame buffer 108 are powered down as well as the rest of the computer as per the normal path the system takes for system hibernation or shutdown. As illustrated in FIG. 7, if in step 706, it is determined that a user is not detected, then in step 714 of FIG. 7, self-refresh is initiated after the inactivity timer reaches the first prescribed time T1. In another embodiment, if a user is not detected in step 706, self-refresh of the display panel is not activated and the process advances to step 716. However, if self-refresh is initiated in step 714, then a combination of traditional dimming and suspension modes in combination with display panel self-refresh with GPU Sleep will allow an even deeper power savings.

As illustrated in FIG. 7, after step 714 or after step 704, when it is determined that visual continuity is not selected, in step 716 of FIG. 7, the display panel backlight is dimmed after the inactivity timer reaches a second prescribed time T2. In step 718 of FIG. 7, the display panel 110 is turned off after the inactivity timer reaches a third prescribed time T3. In step 720 of FIG. 7, the computer system is put into a suspend state after the inactivity tinier reaches the fourth prescribed time T4. In step 722 of FIG. 7, the computer system is put into Hibernation/Shutdown (S4/S5) after the inactivity timer reaches the fifth prescribed time T5.

Figure 8:
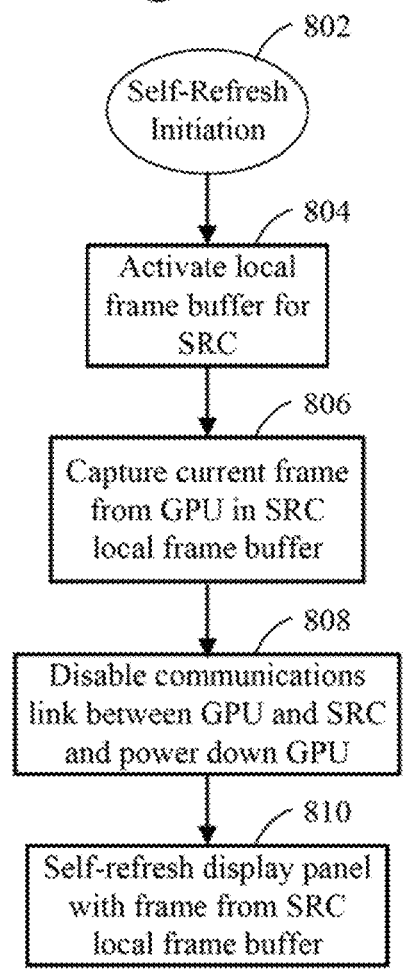
FIG. 8 illustrates an exemplary flow diagram of a method of power management in accordance with an embodiment of the present invention.

FIG. 8 illustrates a process for initiating display panel self-refresh for GPU power conservation. In step 802 of FIG. 8, self-refresh is initiated. In step 804 of FIG. 8, the local frame buffer 108 for a self-refresh controller 106 is activated. In step 806 of FIG. 8, a current frame with display information for the display panel 110 is captured from the GPU 102 in the SRC local frame buffer 108. In step 808 of FIG. 8, the communications link between the GPU 102 and the self-refresh controller 106 is disabled. The GPU 102 is also powered down in step 808. In step 810 of FIG. 8, the display panel 110 is self-refreshed from the SRC local frame buffer 108 as controlled by the SRC 106.

In the aforementioned embodiments, some applications, such as VAN software, instant messaging, Internet download, or other applications, may exhibit negative user experience when the system is suspended. For example a VPN application may disconnect the network connection after system suspend, which would require the user to re-enter security information and key pass-code in order to re-establish the VPN connection. While this behavior is perfectly normal over a normal system suspend, this would present a disruptive experience when the user has selected visual consistency.

Another example is the system configuration option to select password lock on suspend. This option is typically provided by some operating systems to ensure that if the system is suspended that another person cannot illegitimately access it while left unattended. In this mode the screen contents are replaced with a non-descript background and a simple user interface is presented with the option to allow the user to return to the active desktop once the correct password is entered. If the system is placed in suspend with screen in self-refresh, then on resume the user would immediately see the lock out screen defeating the purpose of presenting a visually consistent experience.

Figure 9:
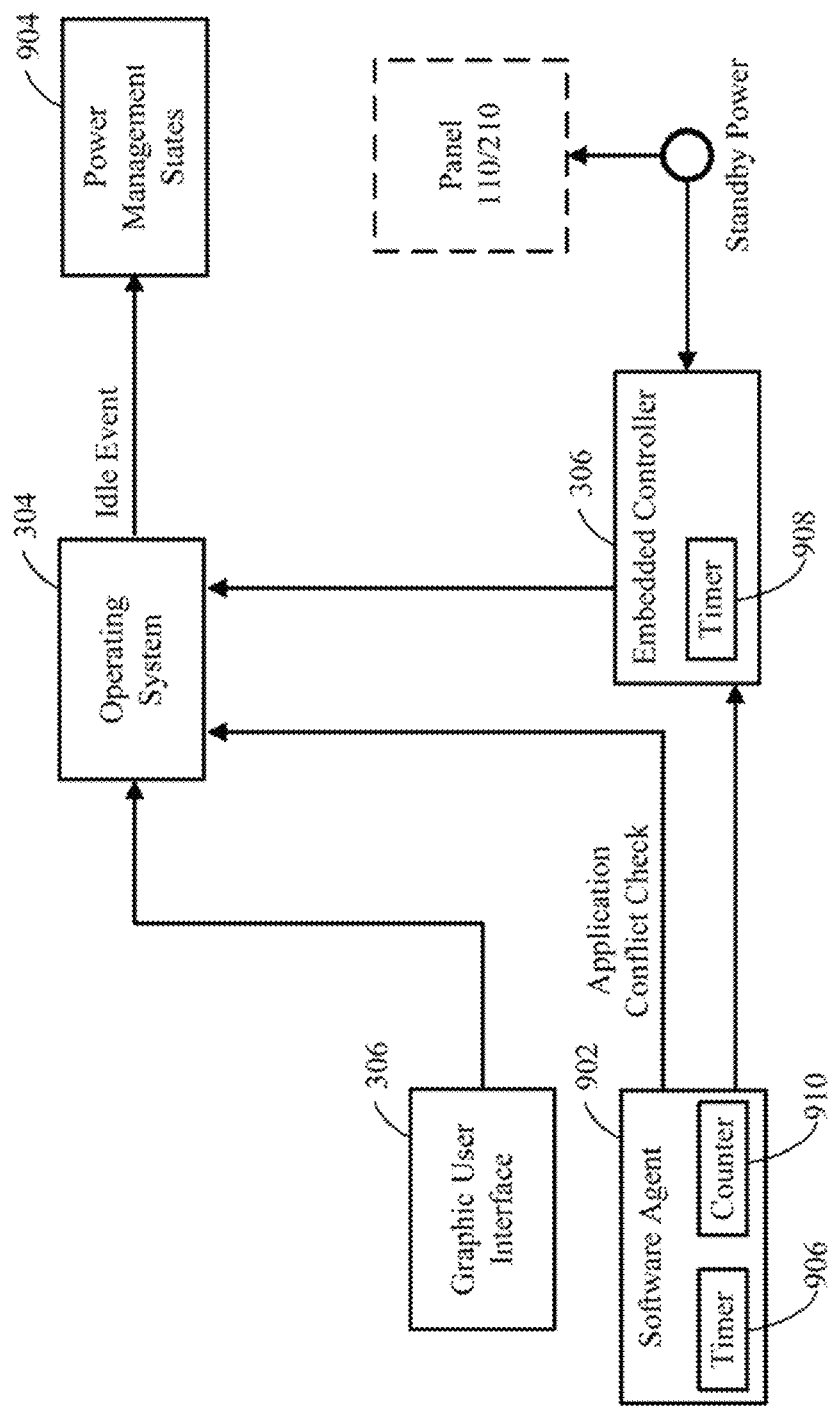
FIG. 9 illustrates an exemplary simplified block diagram of a computer controlled system having power management in accordance with an embodiment of the present invention.

In one embodiment, illustrated in FIG. 9, to prevent such a disruptive experience, a software agent 902 detects active applications or system configurations. The software agent 902 determines whether or not one or more known applications, or system configuration options, are present and active which could produce a negative impact on user experience while the user-selected power management state options are applied.

When the software agent 902 detects the potentially disruptive applications or system configurations to be active the use of deeper power conservation from user-selected power management states 904 by the operating system 304 including suspend is disabled. As illustrated in FIG. 9, such application conflict checks can be performed by the software agent 902 and the result sent to the operating system 304 to enable or disable the above described deeper power conservation states 904. Additionally the user may be presented with information regarding the inability to apply the user-selected power management mode 904 until the potentially disruptive programs are disabled or shut down.

In another embodiment the software agent 902 may disable such applications or system configurations so as to ensure that the system can go into suspend and resume without user noticeable disruption.

A user input through an interface, such as graphical user interface 306, allows enabling suspend state in combination with self-refresh functionality (suspend-in-self-refresh) and subsequently allows selectable periodicity for the feature, from the rate in which the system will remain active and be placed in the suspended state. As discussed in detail below and illustrated in FIG. 10, from the periodicity, a time interval S1 may be determined for which the system must have been idle before the system suspend state shall be applied. Since the display device may already be self-refreshed, entering suspend, enters the above mentioned suspend-in-self-refresh. A second interval S2 may also be determined for which the system shall remain in said system suspend state before re-awakening. Lastly, a third time interval S3 defines a time period for the system to remain awake to perform any work updates, and check for changes in user presence, before re-entering the system suspend state and repeating the process.

In another embodiment where a proximity sensor 308 is provided to detect the presence of a user, a fourth time interval S4 may be entered when a user is not detected by the proximity sensor 308, for which user absence for the duration of time interval S4 shall cause the suspend in self-refresh to be abandoned and a return to the use of regular system suspend.

In one embodiment, as illustrated in FIG. 9, a timer 906 in the software agent 902 counts the first interval of idleness (S1), which minimally includes a lack of user interaction, and may in one embodiment additionally include using a proximity detector 308 to detect that while inactive, the user is in fact still present in front of the device. In another embodiment the combination of user inactivity and the lack of any visible graphical activity may in combination be required before entering the suspend state. Upon detecting the required amount of idleness (S1) the software agent 902 shall pass time interval setting S2 to a timer function 908, cause the display to be placed in self-refresh state, and cause the system to enter suspend.

As illustrated in FIGS. 3 and 9, the embedded controller 306 remains powered while the system is in the suspend state. In one embodiment this embedded controller 306 performs the timer function 908 counting the second interval S2, and upon expiration of the interval the embedded controller 306 triggers resume from system suspend. In another embodiment, the timing function 908 may be optionally provided by hardware that is also powered during system suspend. As also illustrated in FIGS. 3 and 9, the display panel 110/210 may also remain powered by standby power while in the suspend state to provide the herein described suspend-in-self-refresh state.

In another embodiment the embedded controller 306 can also detect activity from input devices that remain powered while in suspend, such as buttons, keyboard 310, touch screen sensor 312. While in the suspend-in-self-refresh state the activity on such user input devices may cause an immediate resume from the system suspend state. Upon resume from suspend the display exits the self-refresh state.

In one embodiment upon re-awakening from suspend-in-self-refresh the system software agent 902 shall detect the wake condition and if determined that this is the periodic resume from suspend-in-self-refresh the software agent 902 shall start a timer 906 using the third time interval S3. During this third time interval S3 running applications may resume activity, perform regular updates and update their graphical on-screen content. Upon expiration of the timer interval S3 the display 110 is again placed in self-refresh and the software agent 902 causes the system to re-enter the system suspend state.

In another embodiment the software agent 902 may additionally evaluate the proximity sensor 308 during the S3 interval, and if no user presence is detected then increment a counter 910, or alternatively if the user is present shall reset the counter 910. On each subsequent re-awaken from suspend-in self-refresh the counter 910 is checked and if the count 910 has reached a first threshold, and the period of sleep or suspend is above another threshold, and thus the time the user has been absent has crossed a fourth threshold S4, indicating the user has not been present for a substantial time, the software agent 902 shall abandon use of suspend-in-self-refresh and shall instead proceed into normal system suspend.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer system comprising:
   a graphics processor;
   a local frame buffer;
   a display device;
   a system agent operable to detect an absence of active software applications and system configurations capable of rendering a disruptive user experience during system suspend, wherein a disruptive user experience comprises a user input on resume; and
   a memory for storing instructions, that when executed by the computer system perform a method of entering a power conservation state, the method comprising:
      detecting a system idle event;
      activating the local frame buffer;
      storing display information in the local frame buffer from the graphics processor;
      initiating a power reduction state for the graphics processor;
      self-refreshing the display device during the power reduction state for the graphics processor with the display information stored in the local frame buffer; and
      initiating a system suspend comprising a power reduction state for the computer system provided the system agent detects the absence of disruptive software and system configurations.

2. The computer system of claim 1, wherein the system idle event occurs when the computer system has been idle for a first prescribed length of time.

3. The computer system of claim 1 comprising input devices, and wherein at least one input device of the said input devices remains active during the power conservation state.

4. The computer system of claim 3, wherein the method further comprises exiting the power conservation state when the computer system receives an input from at least one input device.

5. The computer system of claim 1, wherein the system agent is operable to wake the computer system from system suspend to system resume and takes as input a plurality of user selectable periodicities comprising: a first time interval during which the computer system is idle after which system suspend is initiated, a second interval during which the computer system is suspended after which the computer system awakens from system suspend, and a third time interval during which the computer system remains awake to perform work updates, before re-entering system suspend for another second interval.

6. The computer system of claim 5 further comprising a system timer operable to count the first time interval and the second time interval, and wherein the system timer is operable to trigger an entry into, and to wake from, system suspend.

7. The computer system of claim 5, wherein waking from system suspend after the second interval also causes a timed exit from self-refreshing the display device, wherein applications update and updated content is sent by the graphics controller to the display device during the timed exit from self-refreshing the display device.

8. The computer system of claim 7, wherein after waking from system suspend, a second timer counts the third time interval which on expiration causes re-entry into the self-refreshing the display device and re-entry into system suspend if no user input is detected.

9. The computer system of claim 8 further comprising proximity detectors, wherein the method further comprises evaluating the user proximity detectors after waking from system suspend and incrementing a counter when an absence of a user is detected and resetting the counter when a presence of the user is detected.

10. The computer system of claim 9, wherein the method further comprises:
    reducing backlight power to dim the display device when the counter reaches a first threshold count;

disabling the display device when the counter reaches a second threshold count; and exiting self-refreshing the display device and placing the computer system in system suspend when the counter reaches a third threshold count.

11. The computer system of claim 1, wherein the method further comprises exiting self-refreshing the display device and placing the computer system in system suspend upon detecting an instruction to enter system suspend.

12. The computer system of claim 1, wherein the system agent comprises a software agent.

13. The method of claim 12, wherein system suspend is not applied while any active software applications and system configurations are present.

14. A method of a computer system entering a power conservation state, the method comprising:
   detecting a system idle event of the computer system;
   detecting an absence of active software applications and system configurations capable of rendering a disruptive user experience during a system suspend, wherein a disruptive user experience comprises a user input on resume;
   activating a local frame buffer;
   storing display information in the local frame buffer from a graphics processor;
   initiating a power reduction state for the graphics processor;
   self-refreshing a display device during the power reduction state for the graphics processor with the display information stored in the local frame buffer; and
   initiating the system suspend comprising a power reduction state for the computer system provided the system agent detects the absence of disruptive software and system configurations.

15. The method of claim 14, wherein the system idle event occurs when the computer system has been idle for a first prescribed length of time.

16. The method of claim 14 further comprising exiting the power conservation state when the computer system receives an input from at least one input device.

17. The method of claim 14, further comprising:
   initiating system suspend after a first time interval;
   waking from system suspend with system resume after a second time interval; and
   reinitiating system suspend after a third time interval.

18. The method of claim 17, wherein waking from system suspend after the second interval also causes a timed exit from self-refreshing the display device, wherein applications update and updated content is sent by the graphics controller to the display device during the timed exit from self-refreshing the display device.

19. The method of claim 17 further comprising:
   evaluating proximity detectors after exiting from system suspend and incrementing a counter when an absence of a user is detected and resetting the counter when a presence of the user is detected and:
   reducing backlight power to dim the display device when the counter reaches a first threshold count;
   disabling the display device when the counter reaches a second threshold count; and
   exiting self-refreshing the display device and placing the computer system in system suspend when the counter reaches a third threshold count.

20. The computer system of claim 14, wherein system suspend is not initiated when active software applications or system configurations are present.

* * * * *